Dec. 12, 1967     D. W. ELLIOTT     3,357,502

UNIVERSAL BORING MACHINE MOUNTING

Filed Oct. 20, 1965     2 Sheets-Sheet 1

INVENTOR
DARIUS W. ELLIOTT

BY HIS ATTORNEYS
HARRIS, KIECH, RUSSELL & KERN

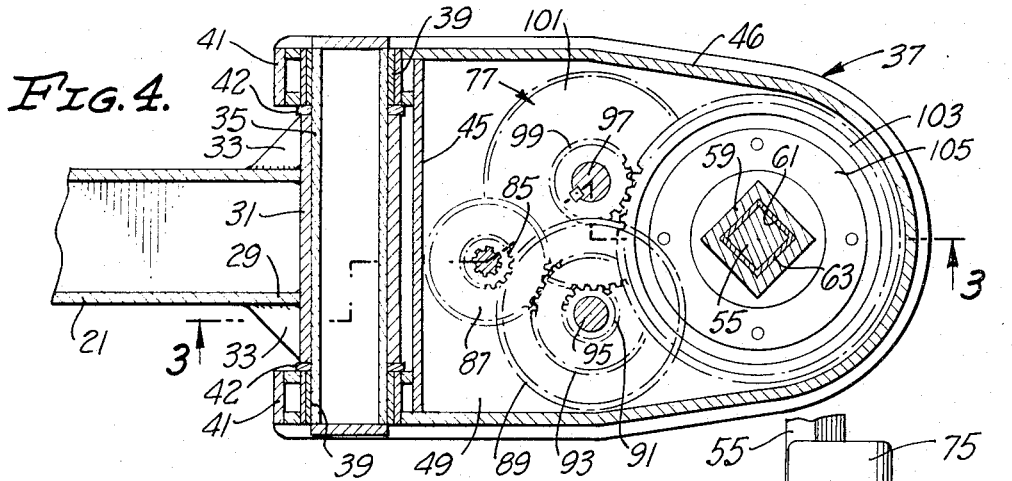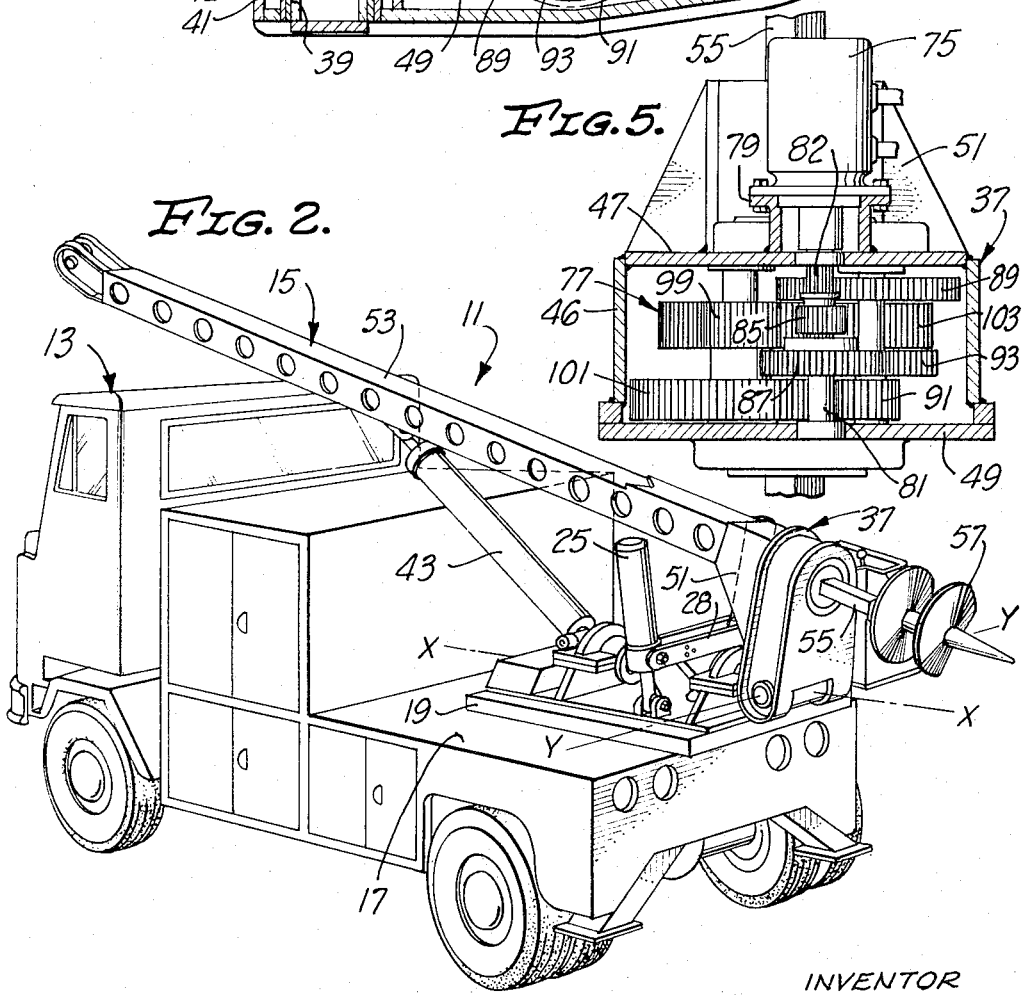

United States Patent Office 3,357,502
Patented Dec. 12, 1967

3,357,502
UNIVERSAL BORING MACHINE MOUNTING
Darius W. Elliott, Anaheim, Calif., assignor to Calavar Corporation, Santa Fe Springs, Calif., a corporation of California
Filed Oct. 20, 1965, Ser. No. 498,212
8 Claims. (Cl. 173—43)

ABSTRACT OF THE DISCLOSURE

A universal boring machine comprising a self-contained earth boring tool and motor means therefore mounted on a supporting member, the supporting member being pivotally mounted on supporting structure, such as a vehicle bed,- and means for positioning the supporting member on the supporting structure about first and second angularly positioned axes.

This invention relates to a mounting assembly and particularly to a mounting assembly for mounting an earth-boring tool of the type used to drill post holes, telephone pole holes, wells, and the like.

The preferred device comprises a self-contained earth boring tool, gear box, and motor means mounted on a supporting structure such as the rear end of a truck bed, for pivotal movement about first and second axes positioned at right angles. Hydraulic cylinders connected to the supporting structure control the pivotal position of the self contained assembly.

It is conventional practice to rotatably mount a boring tool on a support member such as a gear box and in turn secure the gear box to a supporting structure such as a vehicle. The gear box is usually mounted for pivotal movement relative to the vehicle. To rotate the boring tool, a motor is mounted on the vehicle and power therefor is transmitted to the boring tool by various mechanical means such as a drive shaft.

The drive shaft proved troublesome and unduly complicates the mounting assembly. Thus, the drive shaft usually must be supplied with universal joints and other mechanical accessories to enable it to pivot with the gear box. In addition, the conventional mounting assemblies must use additional gear trains and gear boxes to change the direction of motion of the drive shaft at various points along the length thereof such as adjacent the gear box on which the boring tool is mounted. Because the drive shaft is usually exposed, it is a hazard to workmen.

Accordingly, an object of this invention is to eliminate the drive shaft and/or other means for transmitting mechanical power from the supporting structure to the gear box.

Another object of this invention is to eliminate the additional gear boxes necessitated by use of such drive shafts.

A further object of this inventoin is to mount the boring tool and a motor for rotating it on the gear box thereby eliminating the conventional drive train from the supporting structure to the gear box. Another object of this invention is to position the boring tool by appropriately moving or pivoting the gear box relative to the supporting structure. The motor which is mounted on the gear box moves therewith and does not translate relative to the boring tool.

A particular object of this invention is to provide a mounting assembly including a supporting structure, a support member secured to the supporting structure for movement relative thereto, positioning means for moving the support member relative to the supporting structure, motor means mounted on the support member, a boring tool mounted on the support member for rotation relative thereto, and means on the support member for drivingly interconnecting the motor means and the boring tool.

It is an object of this invention to provide a novel boring tool mounting assembly including a shaft rotatable about a first axis and secured to the supporting structure, a gear box carrying a boring tool, a trunnion mounted on one of the shaft and the gear box, and bearing means mounted on the other of the shaft and the gear box, the trunnion being received by the bearing means and rotatable therein about a second axis.

Another object of this invention is to provide a novel arrangement of gears for use in a boring tool mounting assembly for transmitting power from a motor mounted on a gear box to the boring tool and including a sleeve carrying the boring tool and mounted in the gear box for rotation relative thereto and a ring gear secured to the sleeve substantially concentric therewith and driven by the motor. Another object of this invention is to provide a gear train which may be selectively engaged and disengaged for interconnecting the motor and the boring tool.

The invention, both as to its organization and method of operation, together with further objects and advantages thereof, may best be understood by reference to the following description taken in connection with the accompanying drawings in which:

FIG. 2 is a perspective view similar to FIG. 1 with the boring tool pivoted to a transport or carrying position;

FIG. 4 is an enlarged fragmentary vertical sectional view taken along line 4—4 of FIG. 3 showing the gear train and the means for interconnecting the rotatable shaft and the gear box; and FIG. 5 is a sectional view taken along line 5—5 of FIG. 3 further illustrating the gear train.

Figure 1:
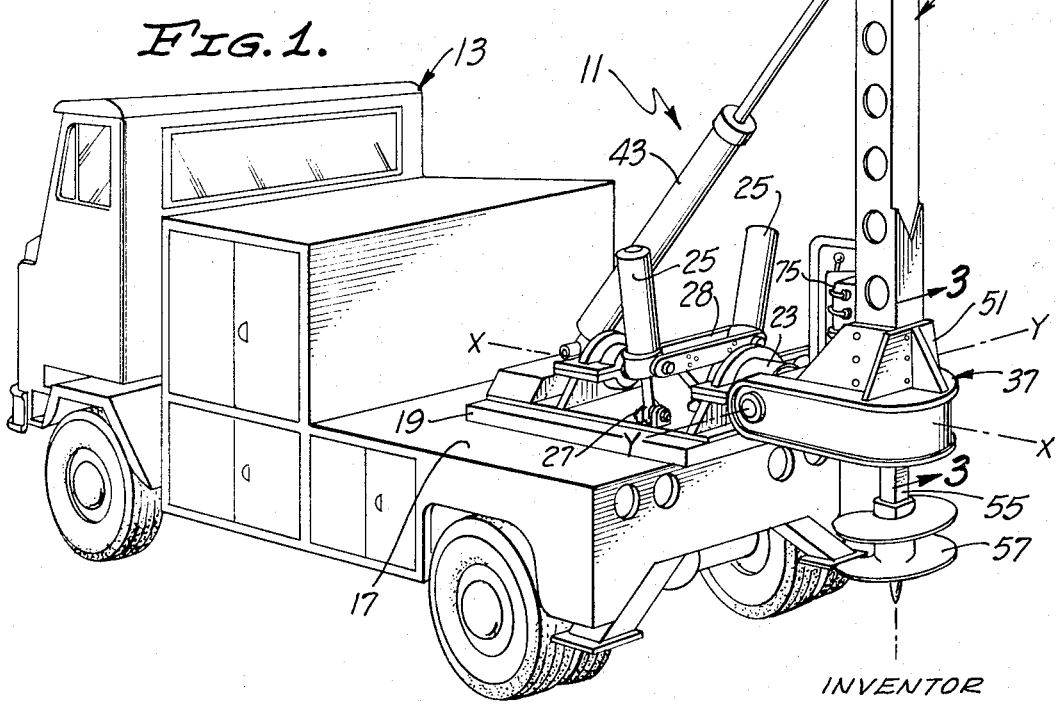
FIG. 1 is a perspective view of a mounting assembly for mounting a boring tool on a vehicle and embodying the teachings of the present invention with the boring tool being illustrated in the vertical or operative position.

Referring to the drawings and in particular to FIGS. 1 and 2 thereof, reference numeral 11 designates a boring tool mounting assembly which includes a vehicle 13 or other suitable supporting structure and a boring tool assembly 15. The vehicle or truck 13 includes a flat truck bed 17 to which a platform 19 is secured. A shaft 21 (FIGS. 3 and 4) is rotatably mounted in a bearing assembly 23 for rotation about its longitudinal axis. Two conventional fluid-operated piston cylinder actuators 25 have the pistons thereof secured by bolts 27 to the platform 19 and the cylinders thereof are interconnected by a connector 28 which is also secured to the inner end of the shaft 21. Thus, by supplying fluid pressure to the actuators 25, the cylinders thereof move together to cause pivotal movement of the shaft 21 about an X—X axis.

The shaft 21 extends rearwardly along the truck bed 17 and has an outer end 29 (FIGS. 3 and 4) positioned adjacent the rear end of the truck bed. A sleeve 31 is welded to the end 29 preferably perpendicular to the shaft 21, such connection being reinforced by a plurality of brackets 33. A trunnion 35 is received by the sleeve 31 and protrudes axially from each end of the sleeve. A gear box or support member 37 carries a pair of sleeve bearings 39 which rotatably receive the protruding ends of the trunnion 35. The sleeve bearings 39 are carried by two forwardly extending bearing housing units 41 which are separated from the sleeve 31 by a pair of bearings 42. The bearings 39 and the trunnion 37 serve to mount the gear box 37 for rotation about an axis Y—Y (FIGS. 1 and 2) which is generally perpendicular to the axis X—X.

The trunnion 35 and the bearings 39 also cause the gear box 37 to rotate with the shaft 21 about the X—X axis. Thus, the gear box 37 is mounted for universal movement relative to the truck 13.

To pivot the gear box 37 and the boring tool assembly 15 carried thereby, a conventional fluid-operated piston-cylinder actuator 43 or other variable length means is provided. The cylinder of the actuator 43 is secured to the platform 19 and the piston thereof is secured to the boring tool assembly 15 at a point above the Y—Y axis. By varying the length of the actuator 43, the boring tool assembly 15 may be pivoted about the Y—Y axis between the positions illustrated in FIGS. 1 and 2 and to various other positions about this axis. In the position illustrated in FIG. 1, the boring tool assembly 15 is generally vertical, this being a preferred boring position. FIG. 2 illustrates the boring tool assembly 15 in a transport position for movement between drilling sites. Thus, in the position illustrated in FIG. 2, the boring tool assembly 15 is nearly horizontal and extends forwardly over the cab of the truck 13. The boring tool assembly 15 as shown in FIG. 2 may also be used to bore a hole in a generally vertical surface.

Figure 3:
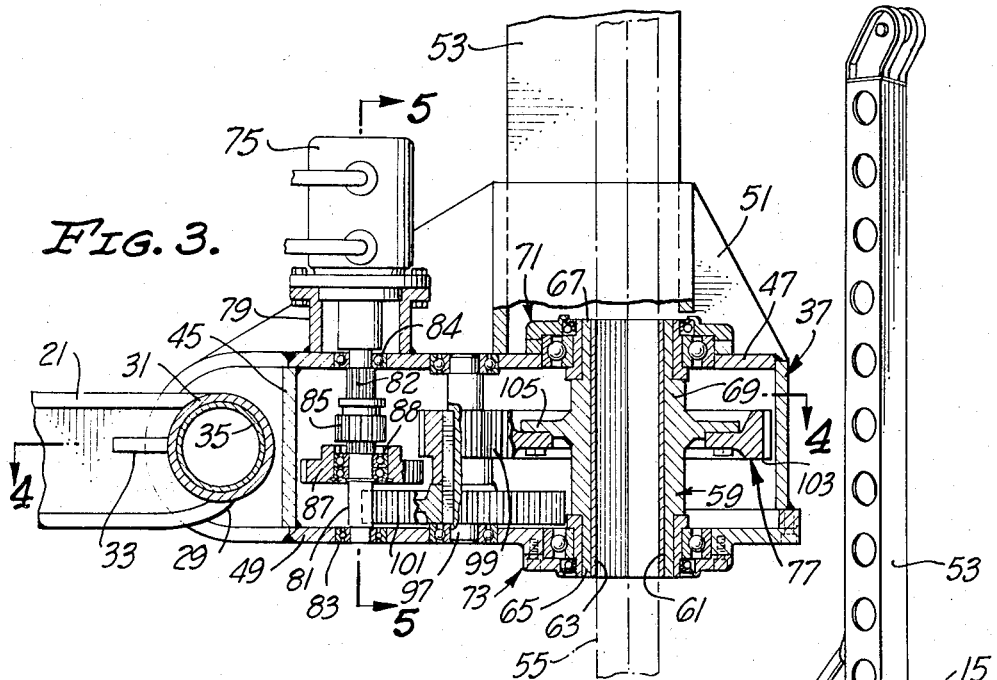
FIG. 3 is an enlarged fragmentary vertical sectional view taken along line 3—3 in FIGS. 1 and 4 and showing the gear train for interconnecting the motor and the boring tool.

With reference to FIGS. 3–5, the gear box 37 is preferably of welded construction and includes a front wall 45, a lateral wall 46, an upper wall 47, and a lower wall 49. A strong mounting bracket 51 is secured to the upper wall 47 as by welding.

The boring tool assembly 15 includes an elongated housing 53 secured to the mounting bracket 51, a square shaft 55 mounted in the elongated housing for rotation and translation relative thereto, and an auger 57 depending from the lower end of the square shaft. The shaft 55 and auger 57 form a boring tool which bores the desired hole. Crowd means (not shown) which may be of conventional design is mounted within the housing 53 for causing axial movement of the auger 57 relative to the housing 53. Preferably, the boring tool is mounted generally perpendicular to and adjacent the rearward end of the gear box 37.

Means are provided within the gear box 37 for mounting the square shaft 55 for rotation and translation relative thereto. Such means include a sleeve 59 having a square passageway 61 extending therethrough with a thin walled hollow square liner 63 secured therein. The square shaft 55 is slidably received by the hollow liner 63. The sleeve 59 has end portions 65 and 67 which are circular in cross section and an intermediate portion 69 having a square cross section. A pair of bearing assemblies 71 and 73 is formed on the upper wall 47 and the lower wall 49, respectively, and receive the end portions 67 and 65, respectively. Thus, by rotating the sleeve 59, the auger 57 is also rotated and by sliding the shaft 55 within the hollow liner 63, the auger may be moved longitudinally.

A motor 75 (FIGS. 3 and 5) which is preferably of the reversible hydraulic type supplies power through a gear train 77 to rotate the auger 57. The motor 75 is bolted to an annular motor amount 79 which is secured to the forward portion of the upper wall 47 of the gear box 37 by any suitable means such as welding. Of course, the motor 75 may be secured to other portions of the gear box 37, the important feature being that no mechanical power needs to be transmitted from the truck bed 17 across the axis X—X or Y—Y. Thus, the motor 75 could be mounted on the gear box 37 by securing the former to the housing 53.

The gear train 77 includes an input stub shaft 81 having splines 82 formed on the intermediate portion thereof and being rotatably mounted by bearings 83 and 84 in the walls 49 and 47 of the gear box 37. An annular pinion 85 having external gear teeth is slidably mounted on the splines 82 and an annular idler gear 87 having both internal and external gear teeth is mounted therebelow on the shaft 81 by a bearing 88. Three gears 89, 91, and 93 are fixed to a pin 95 (FIG. 4) which is rotatably mounted in the walls 47 and 49. Means (not shown) is provided for sliding the pinion 85 along the splines 82 and into engagement with the internal gear teeth of the idler gear 87 or with the gear 89. As shown in FIG. 4, the gears 87 and 93 mesh. Another shaft 97 spaced transversely from the pin 95 and rotatably mounted in the walls 47 and 49 carries two gears 99 and 101, the latter of which meshes with the gear 91. Finally, a large ring gear 103 is suitably secured to a circular web 105 of the sleeve 59 and meshes with the gear 99.

In the operation of the mounting assembly 11, the boring tool 15 is moved in the transport position illustrated in FIG. 2 to the desired area by the truck 13. Next, by utilizing the actuators 25 and 43, the boring tool 15 is positioned so that the auger 57 will enter the earth at the desired angle. In a common drilling position, the auger 57 is vertical; however, other drilling angles are possible.

In drilling a hole, the pinion 85 will normally be caused to engage the gear 89. Power is then transmitted to the auger 57 through the shaft 95, the gears 91 and 101, the shaft 97, and the gears 99 and 103. During this time, the idler gear 87 performs no driving function and may rotate relative to the input shaft 81 on the bearing 88. In removing the auger 57 from a drilled or partially drilled hole, it is usually necessary or desirable to rotate the auger at a higher velocity than that used in boring the hole. To accomplish this, the pinion 85 is moved downwardly on the splines 82 and caused to engage the internal gear teeth on the idler gear 87. Power is then transmitted from the shaft 81 through the pinion 85, gears 87 and 93, pin 95, gears 91 and 101, the shaft 97, and the gears 99 and 103 to the square shaft 55. Because of the relative sizes of the various gears in the gear train 77 as viewed in FIG. 4, the auger will rotate at a higher velocity when driven through the idler gear 87 than through the gear 89. Power to the auger 57 may be cut by moving the pinion 85 out of engagement with the gears 87 and 89.

An important feature of this invention is the mounting of the motor 75 on the upper wall 47 of the gear box 37. This eliminates the drive shaft which in conventional devices extends from the truck bed to the gear box. It also eliminates various mechanical accessories for the drive shaft including universal joints and additional gear boxes which are normally required to change the direction of motion.

Although an exemplary embodiment of the invention has been disclosed, it will be apparent to those having ordinary skill in the art that various changes, modifications, and substitutions may be made without necessarily departing from the spirit and scope of this invention.

What is claimed is:

1. In a mounting assembly, the combination of:
   a supporting structure;
   a support member mounted on said supporting structure for pivotal movement relative thereto;
   positioning means for pivoting said support member relative to said supporting structure about first and second axes, said first axis being angularly positioned relative to said second axis;
   motor means mounted on said support member;
   an earth-boring tool mounted on said support member for rotation relative thereto; and
   means on said support member for drivingly interconnecting said motor means and said boring tool.

2. A combination as defined in claim 1 wherein said interconnecting means includes a gear train and said support member includes a gear box housing said gear train.

3. In a mounting assembly, the combination of:
   a supporting structure;
   a shaft mounted on said supporting structure for pivotal movement relative thereto about a first axis;
   a gear box secured to said shaft for rotation therewith;
   pivotal means providing for movement of said gear box about a second axis, said second axis being angularly positioned relative to said first axis;
motor means mounted on said gear box;
gear means within said gear box, said gear means being drivingly connected to said motor means;
a boring tool secured to said gear box and drivingly connected to said gear means;
means for pivoting said shaft relative to the supporting structure about said first axis; and
means for pivoting said gear box about said second axis.

4. A combination as defined in claim 3 wherein said means for pivoting said gear box about said second axis includes variable length means which has one end thereof connected to the supporting structure.

5. A combination as defined in claim 3 wherein said pivotal means providing for movement of said gear box about said second axis interconnects said shaft and said gear box.

6. A combination as set forth in claim 3 wherein said pivotal means providing for movement of said gear box about said second axis includes a trunnion on one of said shaft and said gear box and bearing means on the other of said shaft and said gear box, said trunnion being received by said bearing means and rotatable therein about said second axis, said trunnion and bearing means interconnecting said shaft and said gear box.

7. A combination as defined in claim 3 wherein said gear means includes a pinion driven by said motor means and first and second gears, said pinion being selectively engageable with said first and second gears to rotate said boring tool at a plurality of velocities.

8. In a mounting assembling, the combination of:
a truck having a truck bed;
a shaft mounted on said truck bed for pivotal movement relative thereto about a first axis, said shaft extending rearwardly and having an end positioned adjacent the rear end of said truck bed;
a trunnion secured to said end of said shaft for pivotal movement therewith about said first axis, said trunnion being generally perpendicular to said first shaft;
a gear box having forward and rearward ends with the forward end being closer to said truck bed than said rearward end;
at least one sleeve bearing secured to said forward end of said gear box and rotatably receiving said trunnion, said gear box being pivotable with said shaft about said first axis and said bearing providing for pivotal movement of said gear box about a second axis, said second axis being angularly positioned relative to said first axis;
motor means mounted on said gear box;
a boring tool mounted on said gear box adjacent the rearward end thereof for rotation relative thereto, said boring tool being generally perpendicular to said gear box;
a gear train in said gear box drivingly interconnecting said motor means and said boring tool;
variable length means for pivoting said gear box about said second axis; and
means for pivoting said shaft about said first axis.

References Cited
UNITED STATES PATENTS

| | | | |
|---|---|---|---|
| 2,810,550 | 10/1957 | Cohen et al. | 173—43 X |
| 2,856,155 | 10/1958 | Putt | 173—43 X |
| 2,863,638 | 12/1958 | Thornburg | 173—163 X |
| 3,191,450 | 6/1965 | Wilson | 173—163 X |
| 3,240,278 | 3/1966 | Witwer | 173—43 X |

FRED C. MATTERN, JR., *Primary Examiner.*

L. P. KESSLER, *Assistant Examiner.*